United States Patent [19]

Eaton

[11] Patent Number: 5,509,868

[45] Date of Patent: Apr. 23, 1996

[54] GOVERNOR INTERLOCK VALVE

[75] Inventor: James R. Eaton, Carmel, Ind.

[73] Assignee: General Motors Corporation, Detroit, Mich.

[21] Appl. No.: 304,892

[22] Filed: Sep. 13, 1994

[51] Int. Cl.$^6$ .................................................. F16H 61/26
[52] U.S. Cl. ..................... 477/130; 477/150; 477/906; 475/119
[58] Field of Search ..................... 475/116, 121, 475/127, 119, 129; 477/130, 150, 156, 906

[56] References Cited

U.S. PATENT DOCUMENTS

| | | | |
|---|---|---|---|
| 4,023,447 | 5/1977 | Sakai et al. | 477/156 X |
| 4,307,631 | 12/1981 | Iwanaga et al. | 477/125 |
| 4,501,174 | 2/1985 | Sugano | 477/135 |
| 4,995,285 | 2/1991 | Hayakawa et al. | 477/906 |
| 5,136,898 | 8/1992 | Hirose | 477/150 |
| 5,399,130 | 3/1995 | Long | 477/130 |

*Primary Examiner*—Charles A. Marmor
*Assistant Examiner*—Peter Kwon
*Attorney, Agent, or Firm*—Donald F. Scherer

[57] ABSTRACT

A transmission control wherein modulating solenoid valves provide for continued governor and accumulator trim boost in the event of a malfunction in either the electrical or the hydraulic system. The transmission control provides redundancy to permit continued operation in the event one of the modulating solenoid valves fails. A single interlock valve is employed to prevent the two modulating solenoid valves from pressurizing the governor and the trim boost circuits when the transmission is operating in the reverse drive range.

2 Claims, 3 Drawing Sheets

GOVERNOR INTERLOCK VALVE

TECHNICAL FIELD

The present invention relates generally to transmission controls. More particularly, the present invention relates to transmission controls that combine electrical and hydraulic operation. Specifically, the present invention relates to transmission controls which utilize a single interlock valve to prevent the pulse width modulating valves from pressurizing the governor and trim boost circuits when the transmission is operating in reverse.

BACKGROUND OF THE INVENTION

Power-shifting automatic transmissions of both the planetary type and the countershaft type use hydraulically actuated torque transfer devices to effect the selection of sequential drive ranges by selectively engageable friction members. Planetary type transmissions use friction torque transfer devices of both the clutch and brake variety. Countershaft type transmissions use friction torque transfer devices of only the clutch variety. The control mechanism which determines the shift sequence and timing for these transmissions can be either hydraulic control valving or the more recently introduced electro-hydraulic control valving. With electro-hydraulic controls, a pre-programmed digital computer is generally provided to determine both the shift schedules and pressure levels of the hydraulic actuating fluid within the transmission. The computer employs a look-up table which has the necessary data to determine the shift points in response to input signals from vehicle parameter detectors, such as the vehicle and engine speed sensors, engine torque level sensors, throttle position sensors and the like.

The computer analyzes the input signals and refers to the look-up table to determine the appropriate ratio interchange. The computer can also provide the necessary control signals to establish the desired output pressure of the solenoid valves. Generally, the solenoid valves are either of the on-off type or the pulse width modulated (PWM) type. With either type, the output signal is delivered to either a valve, which will control the ratio interchange, or to the friction devices directly.

Currently employed control devices typically utilize a governor and throttle signal to control the ratio interchange. In some instances, this signal is combined by the electronics to provide a single electrical output signal which will determine the output pressure of the solenoid control valving. Should the solenoid valve have a malfunction, the transmission control includes a limp-home feature which causes the transmission to select a fixed gear ratio until proper repairs are undertaken. This feature prevents the driver from being stranded due to an electrical or mechanical malfunction of the solenoids.

The purpose of the governor valve is to direct the higher of the two solenoid pressures to the governor pressure passage and to the boost side of a plug valve incorporated in the trim boost valve. The governor valve also directs the lower of the two solenoid pressures to the other side of the plug valve in the trim boost valve. Trim boost pressure is maintained at a level determined by a spring that is set by the differential pressure between solenoids which act on the plug through a pin and stop structure. During upshifts, one solenoid is operated at a lower level than the other solenoid so that a differential pressure exists on the trim boost plug resulting in the desired trim boost pressure. Between upshifts, the pressure of the solenoid operated at the lower level rises to the same level as the other solenoid. Interlock valves provide the control that will "lock-out" a solenoid if a malfunction occurs which provides a pressure continuously greater than zero. The "lock-out" is introduced when the transmission is shifted to reverse, thereby ensuring that the vehicle speed is essentially zero to prevent any unscheduled downshifts. The control will permit the operator to resume normal operation although the upshifts will be harsh because of the high trim boost. This will remind the operator that some service is needed.

The control devices currently known, such as depicted in U.S. patent application, Ser. No. 08/073,238, filed on Jun. 7, 1993, in the name of Long and assigned to the assignee of the present invention, have a separate interlock valve for each of the solenoid valves. The use of separate interlock valves provides highly satisfactory operation. However, such a system not only requires more space to house the control but also incurs an increased cost to provide the larger housing and the additional interlock valve.

SUMMARY OF THE INVENTION

It is, therefore, a primary object of the present invention to provide an improved transmission control wherein a single interlock valve provides the desired "lock-out" of the appropriate solenoid valve if a malfunction occurs.

It is another object of the present invention to provide an improved transmission control, as above, wherein conventional, but harsh, upshifting and downshifting continues after a malfunction—even after the driver comes to a stop and selects reverse.

It is a further object of the present invention to provide an improved transmission control, as above, wherein the "lock-out" is introduced when the transmission is shifted to reverse, thereby ensuring that the vehicle has virtually a zero forward speed to prevent any unscheduled downshifts.

It is yet another object of the present invention to provide an improved transmission control, as above, wherein trim boost pressure is maintained at an acceptable level by the differential pressure between a pair of normally open pressure-regulating solenoid valves.

These and other objects of the invention, as well as the advantages thereof over existing and prior art forms, which will be apparent in view of the following detailed specification, are accomplished by means hereinafter described and claimed.

The present invention improves the design of existing transmission controls by combining the two interlocking valves into one, thereby reducing cost and the amount of space required to house the interlock mechanism. The single solenoid interlock valve provides the desired function of preventing the solenoid valves from pressurizing the governor and trim boost circuits while the transmission is in reverse.

A transmission shift control embodying the present invention utilizes a regulator valve means for providing a trim pressure fluid for a plurality of accumulators, including a boost plug. A shuttle valve is employed for selectively directing pressurized fluid to first and second ends of the boost plug as well as for directing pressurized fluid to a governor passage. A single interlock valve selectively directs pressurized fluid from a first solenoid valve through the shuttle valve to the first end of the boost plug as well as through the governor passage. The single interlock valve also selectively directs pressurized fluid from a second solenoid valve through a shuttle valve to the second end of the boost plug when the pressurized fluid from the first solenoid valve is at a greater level than the pressurized fluid from the second solenoid valve. The boost plug is responsive to the fluid from the interlock valve to switch the fluid from the first end of the boost plug when the pressure level of the fluid directed from the second solenoid valve is greater than the pressure level of the fluid directed from the first solenoid valve.

To acquaint persons skilled in the art most closely related to the present invention, one preferred embodiment of an interlock valve embodying the concepts of the present invention and adapted for use with a transmission control—and which illustrates a best mode now contemplated for putting the invention into practice—is described herein by, and with reference to, the annexed drawings that form part of the specification. The exemplary interlock valve is described in detail without attempting to show all of the various forms and modifications in which the invention might be embodied. As such, the embodiment shown and described herein is illustrative and as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
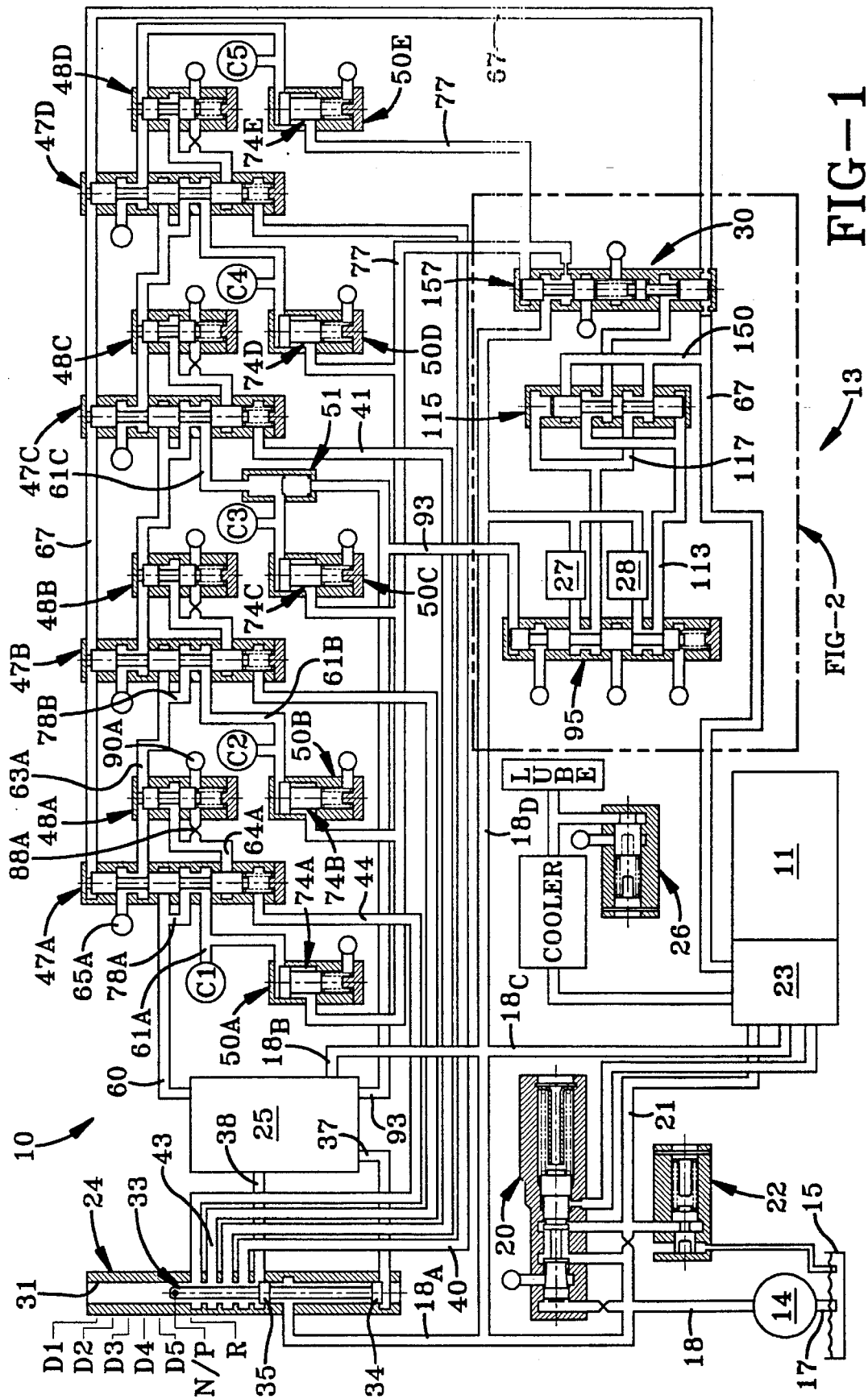
FIG. 1 a diagrammatic representation of a transmission and control embodying the present invention.

The overall power transmission and control system embodying the concepts of the present invention is depicted diagrammatically, and designated by the numeral 10 in FIG. 1. The gearing portion of the transmission is represented by the numeral 11 and is preferably constructed in accordance with the teaching of U.S. Pat. No. 5,009,118 issued to Ordo et al. on Apr. 23, 1991, and also assigned to the assignee of the present invention, although the control portion of the transmission is preferably constructed in accordance with the teaching of the aforesaid, copending U.S. patent application, Ser. No. 08/073,238, filed on Jun. 7, 1993. However, it will also become apparent that other transmissions can also benefit from the present invention.

As depicted in FIG. 1, pressurized hydraulic fluid is provided to the control system 13 by a conventional positive displacement pump 14 which draws hydraulic fluid from a reservoir 15 through an intake passage 17 for delivery to a main line conduit 18. A conventional pressure regulator 20 controls the fluid pressure in the main line conduit 18. The excess fluid—that is, fluid not needed for transmission control and clutch operation—delivered by the pump 14 is directed by an overage passage 21 to a conventional torque converter and clutch assembly 23. A conventional exhaust regulator valve 22 limits the fluid pressure at the torque converter and clutch assembly 23. The fluid flowing from the assembly 23 is directed through a cooler and lubrication system, designated as "COOLER" and "LUBE" on FIG. 1 of the drawings. The pressure in the lubrication system circuit is established by a conventional regulator valve 26.

The main line pressure conduit 18 is connected, by branch $18_A$ with a manual selector valve 24, by branch $18_B$ to a forward-reverse control assembly 25, by branch $18_C$ to a torque converter and clutch assembly 23, and by branch $18_D$ to a first and second normally open pulse width modulated (PWM) solenoid valves 27 and 28 and an accumulator trim boost control valve 30. The main line pressure distributed to the torque converter and clutch assembly 23 is utilized to engage the clutch in a well known manner. The manual selector valve 24 is adapted to be manipulated in a well known manner to distribute the pressurized hydraulic fluid in branch $18_A$ of the main line pressure conduit 18 in accordance with the drive ratio selected by the operator. The selector valve 24 has a longitudinal bore 31 in which a spool valve member 33 is slidably disposed. The spool valve member 33 has spaced lands 34 and 35 which are adapted to selectively control the flow of main line pressurized hydraulic fluid from branch $18_A$ of the main line pressure conduit 18 to a reverse passage 37 when reverse drive "R" is selected by the operator and to a forward passage 38 when any forward drive "D1" through "D5" is selected by the operator.

When the operator desires to limit the number of forward drive ratios to less than the maximum number available (five with the depicted control), the manual selector valve 24 can be manipulated to the forward drive conditions "D4" through "D1". In the "D4" condition, main line pressure is distributed to a "D4" passage 40 as well as the forward passage 38. All of the other passages leading from the selector valve 24 are exhausted. In the "D3" condition, main line pressure is distributed to a "D3" passage 41, as well as the "D4" passage 40 and the forward passage 38. In the "D2" condition, main line pressure is distributed to a "D2" passage 43 as well as the "D3" passage 41, the "D4" passage 40 and the forward passage 38. In the "D1" condition, main pressure is distributed to a "D1" passage 44 as well as the "D2" passage 43, the "D3" passage 41, the "D4" passage 40 and the forward passage 38. The effect of the pressure in passages 40, 41, 43 and 44 will be hereinafter discussed in modestly greater detail, but for an in-depth description reference should be made to the aforesaid U.S. patent application, Ser. No. 08/073,238.

The forward passage 38 and the reverse passage 37 as well as the main line pressure conduit 18 are distributed to the forward-reverse control assembly 25 which is effective to establish the power flow through the transmission in a well known manner. The aforesaid Ordo et al. patent utilizes a synchronizer to establish the forward or reverse power path. The forward-reverse control assembly 25 is preferably constructed in accordance with the assembly described in the aforesaid U.S. patent application, Ser. No. 07/920,744, filed Jun. 1, 1992, in the name of Klemen et al. and assigned to the assignee of the present invention.

The hydraulic control system 13 provides for controlling the engagement and disengagement of the friction torque transfer devices required to establish the ratios in the transmission 11. The ratio interchange control is provided by four shift valves 47A through 47D, four exhaust valves 48A through 48D and five accumulators 502A through 50E.

As previewed in the previous paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least four shift valves which are generally identified by the numeral 47, but the specific individual valves are, therefore, identified as 47A, 47B, 47C and 48D in the specification and on the drawings. This same suffix conventional shall be employed throughout the specification for other components.

The transmission has five friction torque transfer devices in the nature of clutches designated "C1" through "C5." One of the clutches is engaged for each drive ratio while the remaining clutches are disengaged. The clutch "C3" provides both the third forward speed and reverse speed. A two-position shuttle valve 51 is operatively connected to the proper passage of the "C3" clutch.

The spring-biased shift valve 47A controls the first/second ratio interchange—as described in the aforesaid Long U.S. patent application, Ser. No. 08/073,238. The shift valve 47A communicates with a first clutch feed passage 60, a first clutch apply passage 61A, a second clutch feed passage 63A, a first clutch exhaust passage 64A, the hydraulic fluid return line 65A, the "D1" passage 44 and a governor passage 67. The passage 60 is connected with the forward-reverse control assembly 25 which is effective to distribute main line hydraulic pressure thereto when the forward passage 38 is pressurized.

In the spring-set position shown, the valve 47A distributes main line pressure to the clutch feed passage 60 and to the first clutch apply passage 61 to effect engagement of the clutch "C1". The first clutch apply passage 61A is also connected with a chamber in the accumulator 50A. The accumulator 50A is effective to control the pressure rise in the clutch "C1" during engagement in a well known manner. A trim chamber in the accumulator 50A is pressurized by a controlled pressure in a trim passage 77, which has an effect on the pressure rise in the accumulator chamber and therefore the engagement time of the clutch "C1" as determined by the pressure in first clutch apply passage 61.

In the pressure-set position (not shown) of shift valve 47A, the passage 60 is connected to the second clutch feed passage 63A which is in fluid communication with the two/three shift valve 47B. When the spool valve 47B is in the spring-set position depicted, an offset passage 78B connects the feed passage 63A to a second clutch apply passage 61B which is effective, when pressurized, to enforce engagement of the second clutch "C2". The engagement time of the second clutch "C2" is effected by the accumulator 50B in the same manner as previously mentioned with respect to the accumulator 50A.

The pressure in the second clutch feed passage 63A is also ported to react with the spool valve member in the exhaust valve 48A. When the shift valve 47A is initially moved to the pressure-set position, the clutch "C1" will begin to exhaust through the restriction 88A. However, when the pressure in passage 63A is at a sufficient level, passage 64A will connect directly to the hydraulic return line exhaust passage 90A freely to exhaust the clutch "C1". The trigger pressure of the exhaust valve 48A is substantially equal to the minimum pressure required for the clutch "C2" to begin transmitting torque.

As the pressure in the governor passage 67 continues to increase, the shift valves 47C and 47D will be shifted accordingly to control the second/third, third/fourth and fourth/fifth ratio interchanges, respectively. The upshifting occurs in accordance with the clutch interchange previously explained herein with respect to the first/second ratio interchange. Respective accumulators 50 and exhaust valves 48 will control the timing of the clutch interchanges. It should be appreciated that the higher ratio clutches cannot be engaged until the next lower clutch has first been engaged. This is commonly termed a cascading pressure control. It should also be evident that the shuttle valve 51 is effective to connect the passage 61C to the clutch "C3" and the accumulator 50C during a second/third ratio interchange. During downshifting when a clutch is engaged, the higher ranking clutches will be disengaged.

If the transmission 10 is in second gear—i.e.: the valve 47A has upshifted—and the pressure in the governor valve 67 is reduced to a level sufficient to permit a downshift of the shift valve 47A to the spring-set position, the second clutch "C2" will be exhausted through the hydraulic fluid return line 65A while the clutch "C1" is engaged by pressure in passage 60. Rapid disengagement of the off-going clutch during downshifting, is generally preferred to permit the engine to freely accelerate to the speed required to accommodate the on-coming ratio.

The reverse ratio is engaged by the manual selector valve 24 being shifted to the reverse position to pressurize a reverse apply passage 93 which is fed through the forward-reverse control 25. When the passage 93 is pressurized, the shuttle valve 51 is moved to close the third clutch apply passage 61C from the shift valve 47C and simultaneously connect the reverse apply passage 93 with the clutch "C3" and the accumulator 50C. The reverse apply passage 93 is also connected with the governor interlock valve 95 which is in fluid communication with the respective solenoid valves 27 and 28 for a purpose that will be hereinafter described.

The solenoid valves 27 and 28 may be of the PWM type such that each is capable of establishing a variable pressure output. The pressure output of the solenoid valves 27 and 28 will be termed the governor pressure. However, the pressure established by each valve 27 and 28 is effected by a number of vehicle parameters including vehicle speed and throttle setting or fuel feed. Other parameters may be provided as desired. The signals controlling the PWM solenoid valves 27 and 28 are preferably established by a conventional preprogrammed digital computer which is incorporated in the transmission and control 10 and programmed in a conventional manner to establish the various pressures. Such computers and the operating or control algorithms are well known. The solenoid valve 27 is controlled at one pressure schedule while the solenoid valve 28 is controlled at another pressure schedule during upshifting. As should be appreciated, the pressure output of the solenoid valve 27 increases before the pressure output of the solenoid valve 28. The purpose for these different schedules will be explained in conjunction with the description of the valves 30 and 95.

Figure 2:
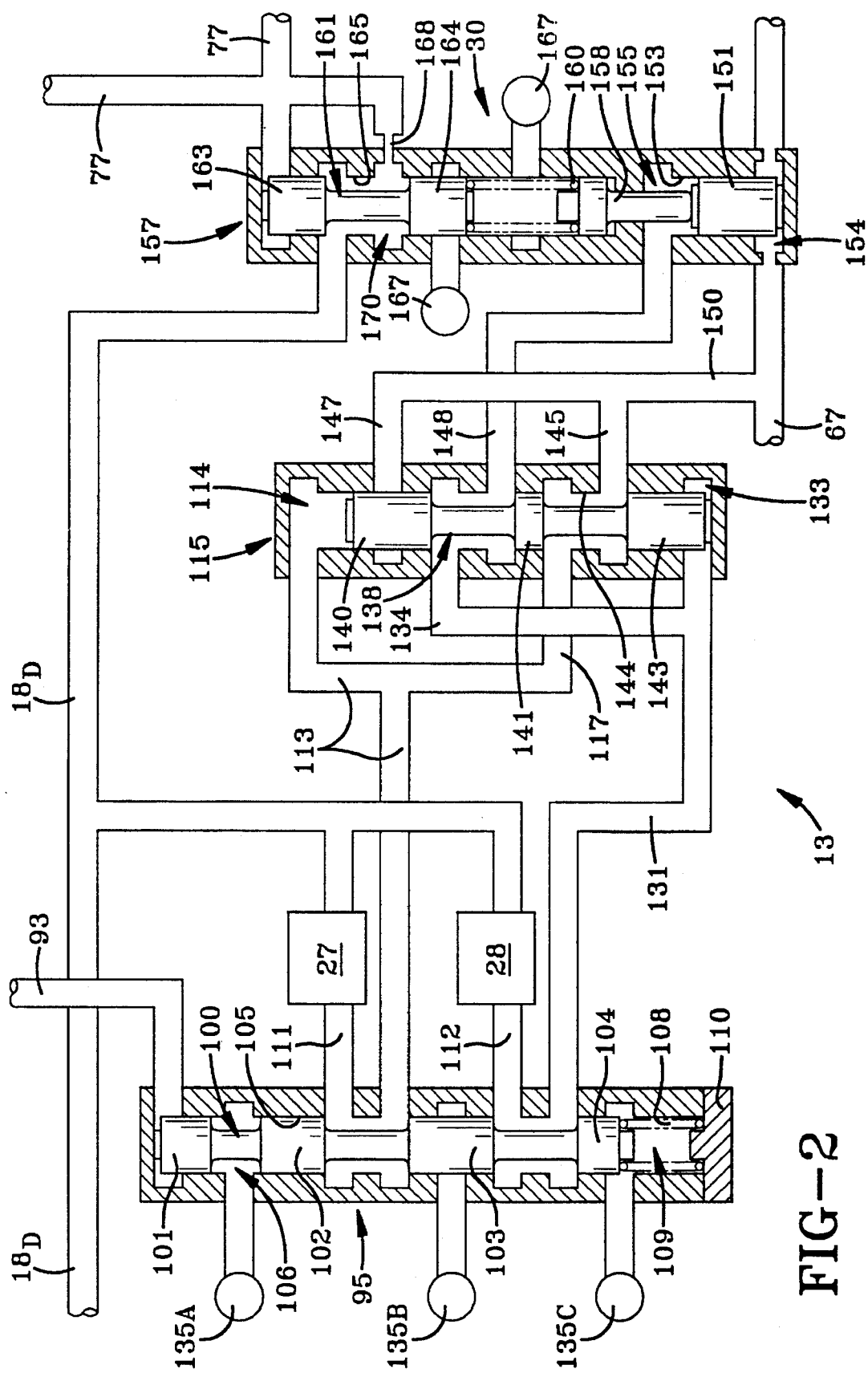
FIG. 2 is an enlarged portion of FIG. 1, the outline of which is delineated by the chain line identified as "FIG. 2" and depicting a representative control valving arrangement incorporating the present invention in the spring-set position; and, FIG. 3 is a further enlarged representation of the interlock valve appearing in FIG. 2, but in the pressure-set position.

As best seen in FIG. 2, the governor interlock valve 95 includes a spool valve member 100 having axially spaced lands 101, 102, 103 and 104 slidably disposed in a bore 105. Lands 101 and 102 cooperate with the bore 105 to define an interlock chamber 106. The interlock chamber 106 communicates with the hydraulic fluid return line 135A when the spool valve member 100 is in the pressure-set position to exhaust any hydraulic fluid that might seep into the interlock chamber 106 past either land 101 or land 102.

The spool valve member 100 is urged toward one end of the bore 105 by a spring 108 disposed in chamber 109 and compressed between a plug 110 and the land 104. In the spring-set position represented in FIG. 2, the output pressure of solenoid valve 27 is in fluid communication, through passage 111, with the bore 105 between the lands 102 and 103 to provide controlled fluid pressure to a control passage 113 which is in fluid communication with a control chamber 114 provided in a governor shuttle valve 115. A governor feed passage 117 branches from the control passage 113 and is also connected with the shuttle valve 115 between lands 14 1 and 143 when the spool valve member 136 is disposed in the position depicted in FIG. 2. Similarly, the output pressure of the solenoid valve 28 is in fluid communication, through passage 112, with the bore 105 between the lands 103 and 104 to provide control fluid pressure to the control passage 131 which is in fluid communication with a control chamber 133 formed on the shuttle valve 115. A governor-feed passage 134 branches from the passage 131 and is also connected with the shuttle valve 115.

The shuttle valve 115, as best seen in FIG. 2, includes a spool valve member 138 having three lands 140, 141 and 143 which are slidably disposed in a bore 144 between the chambers 114 and 133. The bore 144 is disposed in fluid communication with the passages 117 and 134 as well as a pair of governor pressure passages 145 and 147, and a secondary trim boost passage 148. Both governor pressure passages 145 and 147 are connected with a primary boost passage 150 which, in turn, communicates with the primary governor passage 67.

The spool valve member 138 in shuttle valve 115 is positioned by the pressure in the opposed chambers 114 and 133. It should be explained that the pressure from solenoid valve 27 increases before the pressure from solenoid 28. Therefore, the shuttle valve 115, during normal forward operation, will be disposed in the position shown in FIG. 2. So disposed, the pressure from solenoid 27 is directed via passages 113, 117, 145 and 150 to the governor passage 67. The passage 147 is closed at the land 140 and the output pressure of the solenoid valve 28 is directed via passages 131 and 134 to the secondary boost passage 148.

The boost passage 148 is connected for fluid communication with one side of a boost plug 151, and boost passage 150, through governor passage 67 is connected for fluid communication with the opposite side of boost plug 151. The boost plug 151 is a component of the accumulator trim boost valve 30, as depicted in FIG. 2. The plug 151 cooperates with a bore 153 to define a primary chamber 154, connected with governor passage 67 and thereby indirectly with primary boost passage 150. A secondary chamber 155 is connected in fluid communication with the secondary trim boost passage 148. The accumulator trim boost valve 30 also includes a regulator valve portion 157 which is connected with the plug 151 through a pin and stop 158, and a spring 160. The regulator valve portion 157 includes a valve spool member 161 having spaced lands 163 and 164 slidably disposed in a bore 165. The bore 165 is connected with the main line pressure conduit branch $18_D$, the trim passage 77 and a pair of exhaust or hydraulic fluid return lines 167. The trim passage 77 is connected to a control chamber 170 defined between the lands 163 and 164 through a restriction 168.

Fluid pressure in trim passage 77 will urge the spool member 161 against the spring 160 in a direction to close the main line pressure conduit branch 18D at land 163 and open the exhaust passage 167 previously closed by land 164. This action will control the pressure in the trim passage 77 in a well known manner. Fluid pressure operating on the plug 151 will control the amount of compression in the spring 160 and therefore, the pressure level at which the regulator valve 157 maintains the pressure in trim passage 77. When the plug 151 is urged against the spring 160 by pressure in primary chamber 154, as determined by the solenoid valve 27, the pressure level in trim passage 77 will be at a high level, and when both chambers 154 and 155 are pressurized, the pressure level in trim passage 77 will be at a low level. The pressure level in trim passage 77 will provide a bias pressure for the trim chamber 74 in the accumulators 50 (through trim passage 77)—thereby providing a control pressure for the clutches "C1" through "C5" in a well known manner.

The interlock valve 95 is connected with the reverse passage 93 which, as previously explained, is pressurized through the manual selecting valve 24 and the forward-reverse control 25 when the reverse drive is selected by the operator. Specifically, the reverse passage 93 communicates with the face of the land 101 to impose a bias pressure thereon whenever the reverse drive is selected.

Figure 3:
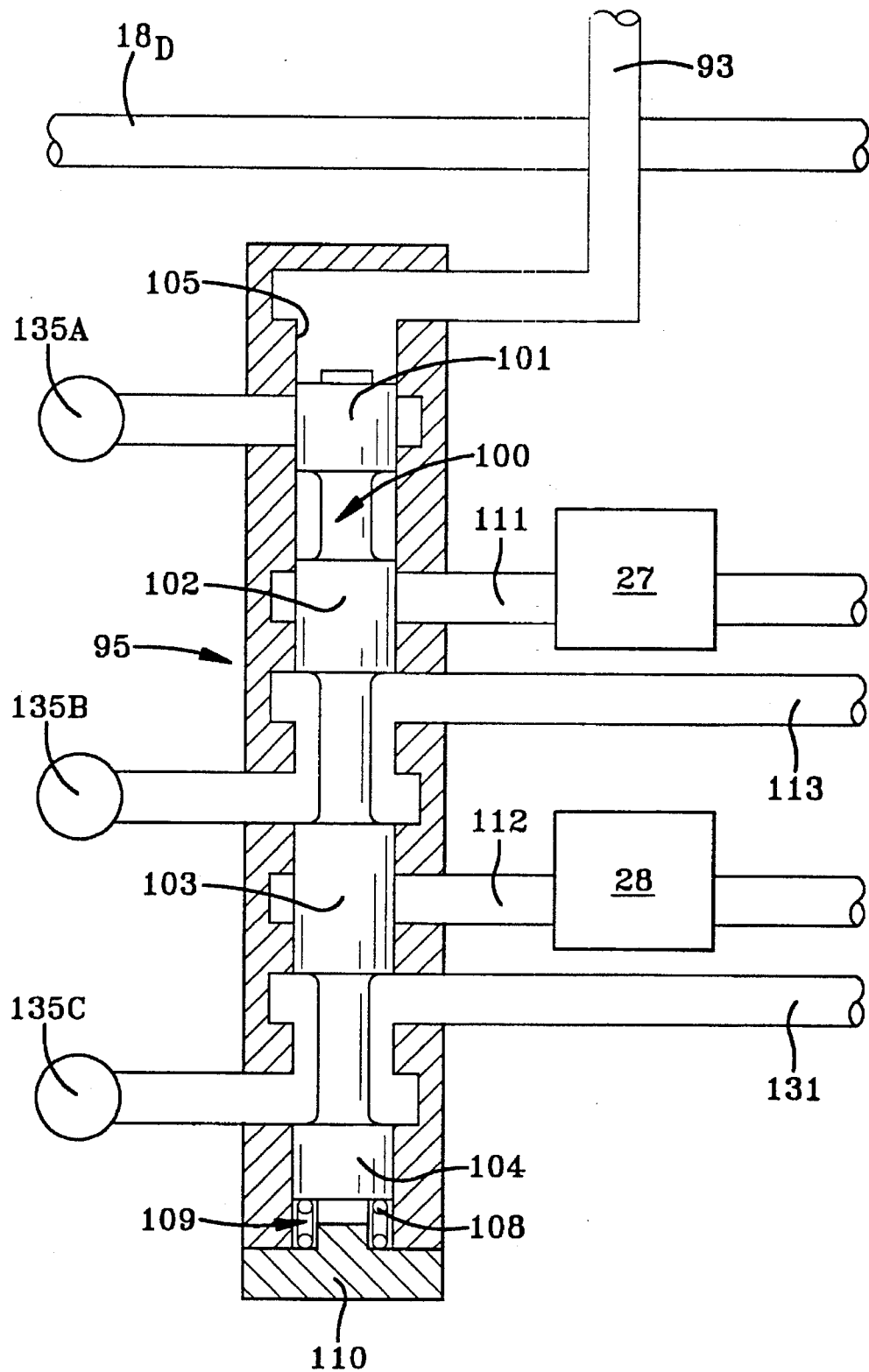

When the reverse passage 93 is pressurized, the spool member 100 will be moved to its pressure-set position represented in FIG. 3 by the fluid pressure acting against land 101. In the pressure-set position, the exhaust passage 135A will be closed by the land 101, and the passage 111 from solenoid valve 27 will be closed by land 102. Also in the pressure-set position, passage 113 from shuttle valve 115 will be connected to exhaust passage 135B between lands 102 and 103. Similarly, in the pressure-set position of spool member 100, the passage 131 from the shuttle valve 115 will be connected with the exhaust passage 135C.

OPERATION

With the vehicle engine operating, the pump 14, in conjunction with the regulator 20, provides pressurized hydraulic fluid. With the selector valve position for "D5", the vehicle will respond to a throttle increase by the operator to provide forward motion.

The transmission can be limited to less than all of the forward speed ratios by manipulation of the manual valve. For example, if the operator does not wish the transmission to reach the fifth forward speed ratio, the manual valve will be moved to the "D4" position. In this position, the "D4" passage 40 will be pressurized. The pressure in this passage 40 is directed to the valve 47D. This pressure acts to assist in resisting the upshifting of the valve 47D. The pressure in the passage 67 will not be sufficient to force the upshifting of the valve 47D.

Manipulation of the manual valve to the other forward ratio positions represented by "D3" through "D1" will result in limiting the upshifting of the transmission to the third forward through first forward ratios, respectively. In "D3", the passage 41 will be pressurized to prevent the upshifting of the valve 47C such that the transmission control cannot energize the clutches "C4" and "C5". Likewise, the pressurization of the respective passages 43 and 41 prevents the shifting of valves 47B and 47A, respectively. The operator can control the upshifting to some extent by starting in "D1" and upshifting to successive gears as desired. The upshift will occur if the other parameters are satisfied—that is, if the pressure in passage 67 is sufficient to shift the respective valves. The operator can downshift from any forward to a lower forward ratio through the manipulation of the manual valve 24.

The purpose of the shuttle valve 115 is to direct the higher pressure output of the two solenoid valves 27 and 28 to the lower end of the plug 151 and to the governor passage 67. When the control system is operating as intended, the solenoid valve 27 will, at a predetermined portion of the cycle, provide a higher pressure than the solenoid 28 during the upshift cycle. However, if the solenoid valve 28 should inadvertently produce a higher pressure than the solenoid valve 27, the chamber 133 will be at a higher pressure resulting in the shuttle valve 115 being forced into the chamber 114. In this position, the passage 131 is connected to the passage 147 between lands 140 and 141 and the passage 117 is connected with the passage 148 between the lands 141 and 143. Thus, it should be evident that the output pressures of the solenoid valves 27 and 28 and their function is then reversed.

If either solenoid valve 27 or 28 should malfunction and provide a constant output pressure other than zero, the normal shift sequences will be interrupted. The operator can eliminate this situation by bringing the vehicle to a stop and shifting to reverse. When the reverse ratio is selected, the reverse apply passage 93 is pressurized. This results in the shuttle valve 91 being moved to direct the fluid pressure in passage 93 to the clutch "C3". Also during a shift to reverse, the forward-reverse control 25 will condition the necessary mechanism (i.e.: a synchronizer) to the proper position.

The pressure in passage 93 will also act on the land 101 to shift the spool valve member 100 against the spring 108 to its pressure-set position (FIG. 3). When the spool valve member 100 is in the pressure-set position, the output pressures from the solenoid valves 27 and 28 are blocked by lands 101 and 102, respectively. If one of the solenoid valves has malfunctioned in a high output pressure condition, the interlock valve 95 will remain in the shifted position because of the pressure bias from the reverse passage 93 against land 101. When the operator shifts to a forward drive condition, and while the spool valve member 101 will then return to the spring-set position, only one solenoid valve pressure output will be available to the governor passage 67 and boost passage 150. This will result in maximum trim boost pressure at the accumulators 50 such that the operator will experience harsh shifting at all throttle controls. This shift feel will continually remind the operator that some repair is required. However, the operator will have the entire range of operation available until the repairs are effected.

The foregoing description of the exemplary embodiment of the invention has been presented for the purposes of illustration and description. It is not intended to be exhausted or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A transmission shift control comprising:

regulator valve means for providing a trim pressure fluid for a plurality of accumulators through a boost control valve having a plug means;

said plug means having first and second ends;

shuttle valve means for selectively directing pressurized fluid to said first and second ends of said plug means and for directing pressurized fluid to a governor passage;

first and second solenoid valve means;

a single interlock valve for selectively directing pressurized fluid from said first solenoid valve means through said shuttle valve means to said first end of said plug means and said governor passage and for selectively directing pressurized fluid from said second solenoid valve means through said shuttle valve means to said second end of said plug means when the pressurized fluid from said first solenoid valve means is at a greater pressure level than the pressurized fluid from said second solenoid valve means; and, said plug means being responsive to the fluid from said interlock valve to switch the fluid from said first end of said plug means when the pressure level of the fluid directed from said second solenoid valve means is greater than the fluid directed from said first solenoid valve means.

2. A transmission shift control comprising:

manual valve means for directing fluid to establish forward and reverse drive ratios;

regulator valve means for providing a trim pressure fluid for a plurality of accumulators through a boost plug means having a plug means;

said plug means having first and second ends;

a governor passage;

shuttle valve means for selectively directing pressurized fluid to said first and said second ends of said plug means and for directing pressurized fluid to said governor passage;

first and second solenoid valve means;

a single interlock valve for selectively directing pressurized fluid from said first solenoid valve means through said shuttle valve means to said first end of said plug means as well as to said governor passage;

said interlock valve also selectively directing pressurized fluid from said second solenoid valve means through said shuttle valve means to said second end of said plug means when the pressurized fluid from said first solenoid valve means is at a greater pressure level than the pressurized fluid from said second solenoid valve means;

said plug means being responsive to the fluid from said interlock valve to switch the fluid from said interlock valve to said first end of said plug means when the pressure level of the fluid directed from said second solenoid valve is greater than the fluid directed from said first solenoid valve; and, said interlock valve blocking fluid flow from both said first and said second solenoid valve means when the reverse drive ratio is selected by said manual valve means.

* * * * *